(12) United States Patent
Dozier et al.

(10) Patent No.: US 10,282,952 B2
(45) Date of Patent: May 7, 2019

(54) METHOD AND APPARATUS FOR SEGMENTED VIDEO COMPRESSION

(71) Applicant: Trover Group Inc., Dallas, TX (US)

(72) Inventors: Charles W. Dozier, Dallas, TX (US); Thomas W. Mitchell, McKinney, TX (US)

(73) Assignee: TROVER GROUP INC., Dallas, TX (US)

( * ) Notice: Subject to any disclaimer, the term of this patent is extended or adjusted under 35 U.S.C. 154(b) by 29 days.

(21) Appl. No.: 15/195,388

(22) Filed: Jun. 28, 2016

(65) Prior Publication Data

US 2016/0307419 A1    Oct. 20, 2016

Related U.S. Application Data

(63) Continuation of application No. 12/131,887, filed on Jun. 2, 2008, now Pat. No. 9,380,256.

(60) Provisional application No. 60/941,931, filed on Jun. 4, 2007.

(51) Int. Cl.
| | |
|---|---|
| *H04N 5/235* | (2006.01) |
| *H04N 5/262* | (2006.01) |
| *G08B 13/196* | (2006.01) |
| *H04N 5/77* | (2006.01) |
| *H04N 5/775* | (2006.01) |
| *H04N 5/781* | (2006.01) |
| *H04N 5/907* | (2006.01) |
| *H04N 9/82* | (2006.01) |
| *H04N 19/50* | (2014.01) |
| *G06K 9/62* | (2006.01) |
| *G11B 27/28* | (2006.01) |
| *H04N 5/85* | (2006.01) |
| *H04N 5/765* | (2006.01) |

(52) U.S. Cl.
CPC ..... *G08B 13/19604* (2013.01); *G06K 9/6201* (2013.01); *G08B 13/1961* (2013.01); *G11B 27/28* (2013.01); *H04N 5/772* (2013.01); *H04N 5/775* (2013.01); *H04N 5/781* (2013.01); *H04N 5/85* (2013.01); *H04N 5/907* (2013.01); *H04N 9/8205* (2013.01); *H04N 19/50* (2014.11); *H04N 5/765* (2013.01)

(58) Field of Classification Search
CPC .......... G08B 13/1961; G08B 13/19604; G08B 13/19606; H04N 5/772; H04N 5/775; H04N 5/781; H04N 5/765; H04N 5/907; H04N 5/77

See application file for complete search history.

(56) References Cited

U.S. PATENT DOCUMENTS

| | | |
|---|---|---|
| 4,606,069 A | 8/1986 | Johnsen |
| 5,751,346 A | 5/1998 | Dozier et al. |
| 5,937,092 A | 8/1999 | Wootton et al. |
| 6,009,204 A | 12/1999 | Ahmad |
| 6,011,901 A | 1/2000 | Kirsten |
| 6,069,655 A | 5/2000 | Seeley et al. |

(Continued)

*Primary Examiner* — Ngoc Yen T Vu
(74) *Attorney, Agent, or Firm* — Fogarty LLP

(57) ABSTRACT

An archival video system uses profile images as a background for an image and delta images to indicate the difference between a current image and a profile image. An image may be segmented into multiple sectors, with each sector compared to a profile sector. The resulting image may be constructed using references to previously stored sectors from different images.

34 Claims, 7 Drawing Sheets

(56) References Cited

U.S. PATENT DOCUMENTS

| | | | |
|---|---|---|---|
| 6,774,905 B2* | 8/2004 | Elfving | G06T 7/0002 |
| | | | 345/421 |
| 6,829,395 B2* | 12/2004 | Alm | H04N 19/507 |
| | | | 348/22 |
| 7,006,701 B2 | 2/2006 | Dijk et al. | |
| 7,116,353 B2 | 10/2006 | Hobson et al. | |
| 7,355,627 B2 | 4/2008 | Yamazaki et al. | |
| 7,428,321 B1* | 9/2008 | Shah | G06K 9/00288 |
| | | | 382/118 |
| 7,436,887 B2* | 10/2008 | Yeredor | G06K 9/00771 |
| | | | 375/240.01 |
| 7,479,980 B2* | 1/2009 | Merheim | G06K 9/00771 |
| | | | 348/152 |
| 7,777,780 B2 | 8/2010 | Oya et al. | |
| 7,778,445 B2* | 8/2010 | Au | G06K 9/00771 |
| | | | 382/103 |
| 8,146,811 B2* | 4/2012 | Kundu | A47F 9/045 |
| | | | 235/375 |
| 9,270,901 B2* | 2/2016 | Iki | H04N 5/23293 |
| 2001/0020979 A1 | 9/2001 | Lathrop | |
| 2006/0209340 A1 | 9/2006 | Ishii | |
| 2009/0102949 A1 | 4/2009 | Steinberg et al. | |
| 2013/0222640 A1* | 8/2013 | Baek | G11B 27/3027 |
| | | | 348/231.99 |
| 2014/0247325 A1* | 9/2014 | Wu | H04N 5/23206 |
| | | | 348/39 |

* cited by examiner

METHOD AND APPARATUS FOR SEGMENTED VIDEO COMPRESSION

CROSS-REFERENCE TO RELATED APPLICATIONS

This is a continuation of, and claims benefit of, U.S. patent application Ser. No. 12/131,887, also entitled Method and Apparatus for Segmented Video Compression, filed Jun. 2, 2008 and issued as U.S. Pat. No. 9,380,256, on Jun. 28, 2016, and therethrough claims the benefit of the filing date of provisional application U.S. Ser. No. 60/941931, filed Jun. 4, 2007, entitled "Method of Video Compression," both of which are incorporated by reference herein.

STATEMENT OF FEDERALLY SPONSORED RESEARCH OR DEVELOPMENT

Not Applicable

BACKGROUND OF THE INVENTION

1. Technical Field

This invention relates in general to video security systems and, more particularly, to an archival video system with segmented frames.

2. Description of the Related Art

Archival video systems are used in many different applications to provide a historical video record. Some applications include, security systems, surveillance and machine control. Early implementations of archival video systems stored video using video cassette recorders (VCRs). While such systems are still used, many applications have changed to storing digitized video on hard disk drives of the type used in computer applications. The disk drives may be local (i.e., on the same premises as the camera) or remote. The data for remote storage can be transmitted over telephone lines, using a modem, or through other means.

While electronic storage capabilities and data bandwidth have been rapidly increasing over the last decade, archival video systems must still compromise between picture quality and storage requirements. Digital compression techniques greatly reduce the size of an image; however, the amount of storage of required for a good quality image of the type that could be used for evidentiary purposes still requires significant storage space.

Therefore, a need has arisen for an archival video system with reduced storage requirements.

BRIEF SUMMARY OF THE INVENTION

In a first embodiment of the present invention, a video recording apparatus includes image receiving circuitry for receiving electronic images, storage means for storing a plurality of profile images and processing circuitry coupled to the imaging circuitry and the storage means. The processing circuitry receives a current image from the imaging circuitry at a specified index, selects a profile image and compares the current image with the selected profile image. A delta file is generated to provide information between the current image and the selected profile image. The delta file and a reference to the selected profile image are associated with the index of the current image.

In a second embodiment of the invention, a video recording apparatus comprises image receiving circuitry for receiving electronic images, storage means and processing circuitry. The processing circuitry receives a current image from the imaging circuitry at a specified index and allocates the current image to a plurality of predefined sectors each containing a portion of the current image. For each of a plurality of the predefined sector images, the processing circuitry compares the predefined sector image with a plurality of previously generated profile sector images stored in a storage device, determines whether the predefined sector image matches a profile sector image within a predetermined threshold, and associates the index and predefined sectors with a profile sector images that match within a predetermined threshold.

The present invention can greatly reduce the capacity needed to store and/or transmit a series of images by referencing pre-existing image data.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-6 of the drawings, like numerals being used for like elements of the various drawings.

Figure 1:
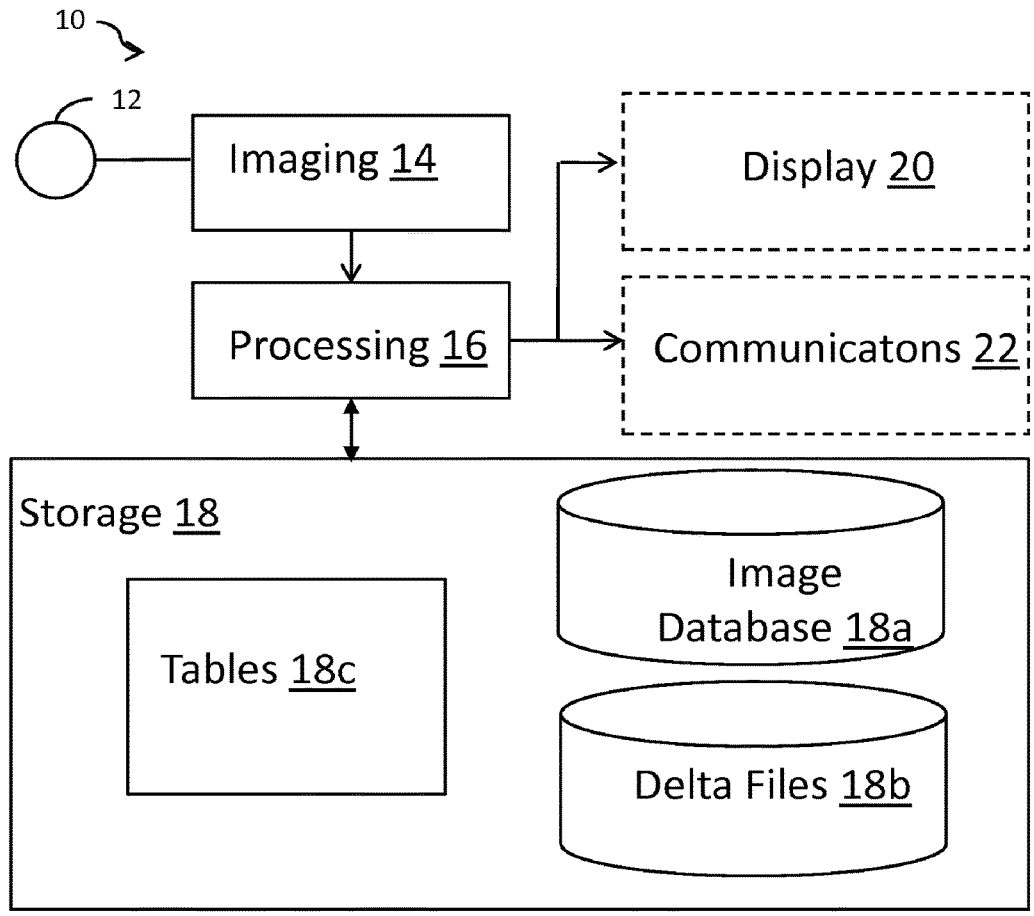
FIG. 1 illustrates a block diagram of an archival video system.

FIG. 1 illustrates a generalized embodiment of an archival video system of the type that can be used to record a series of images for observation and retrieval, such as in a video security system or a video surveillance system. In general, the system described herein is best suited for applications where the camera is fixed and where the motion recorded by the camera is somewhat limited, as will be clear from the description below.

The archival video system 10 receives video from a video source, shown in FIG. 1 as a camera 12 which provides an electronic representation of a received image. The camera 12 is coupled to imaging circuitry 14 which generates an image in a predetermined format responsive from the signals from the camera 12. The camera 12 and imaging circuitry 14 may be in an integrated package. The output of the imaging circuitry 14 is coupled to processing circuitry 16. Processing circuitry 16 could include, for example, a general purpose microprocessor or digital signal processor (DSP), along with software to control the processing circuitry. Typically, the software is stored in a read-only memory (ROM) or an erasable non-volatile memory such as a flash memory or hard drive. Processing circuitry 16 would also include other circuitry, such as random access memory for temporary storage of data and images.

The processing circuitry uses data storage 18 to store full image files in a database 18*a* and delta files in a database 18*b*. A current image is defined by reference to a previously stored image (referred to herein as a "profile" image) and a delta file. The delta file provides the difference information between a profile image and a current image. While a delta file is discussed herein as a file which contains difference information between a current image and a previous profile image, a delta file may reference several previously created delta files necessary to generate the current image, or an approximation thereof, from the selected profile image. The sequence of images is maintained in one or more tables 18*c*. The sequence could be based on time or any other index. For example, the index could be a simple counter in the processing circuitry which is incremental at fixed or variable intervals, or could be tied to an event, such as when a door opens or upon movement of a tool or machine. Data storage 18 could be a hard drive, a non-volatile semiconductor memory, such as a flash memory, a solid-state hard drive, such as a flash hard drive, combinations of semiconductor and magnetic memories, or any other device capable of storing electronic image files.

Processing circuitry 10 may also include a display 20 and/or communication circuitry 22 to transmit information so that the camera 12 may be monitored at a remote location, or so that the information from the camera can be archived at a remote location.

Additional details on the implementation of an archival video system are given in U.S. Pat. No. 5,751,346, issued May 12, 1988, which is incorporated by reference herein.

Figure 2:
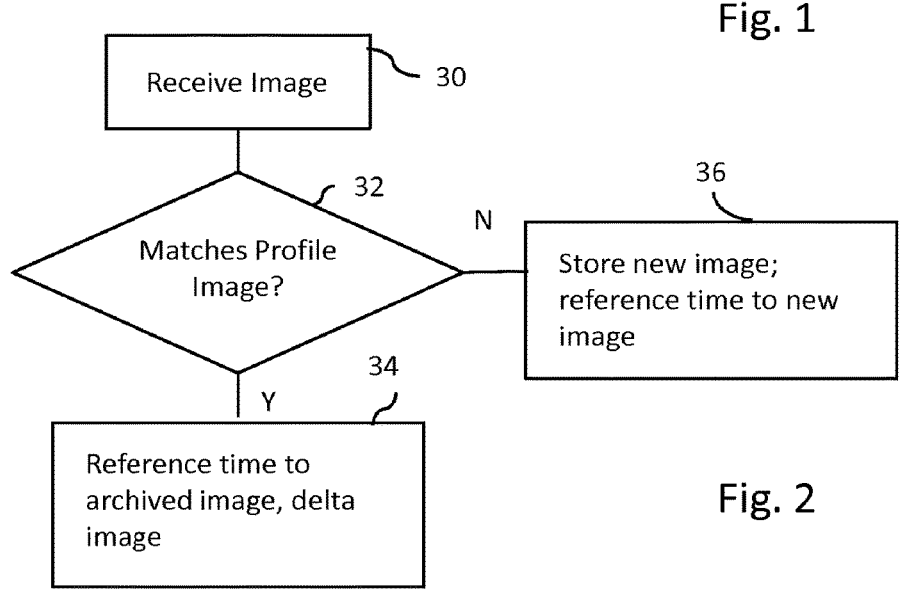
FIG. 2 illustrates a flow diagram describing operation of the processing circuitry of the archival video system with regard to updating images.
Figure 3A:
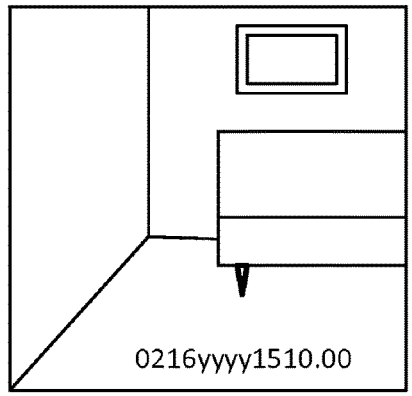
FIGS. 3a through 3h illustrate an example of profile images.
Figure 3B:
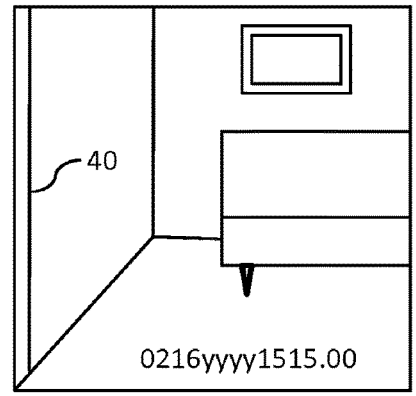
Figure 3C:
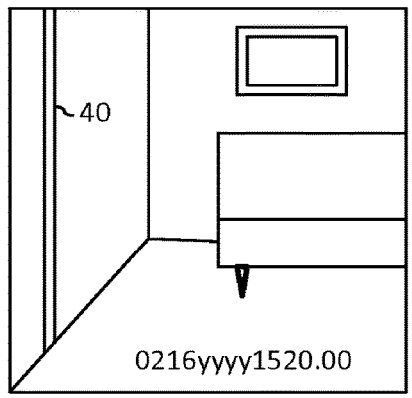
Figure 3D:
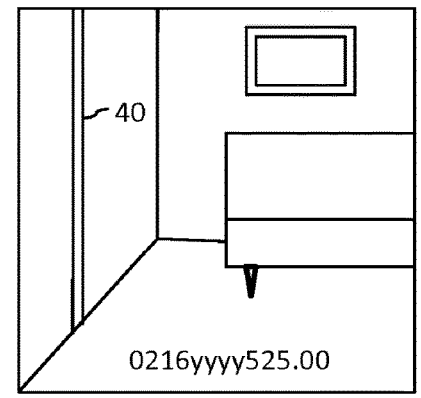
Figure 3E:
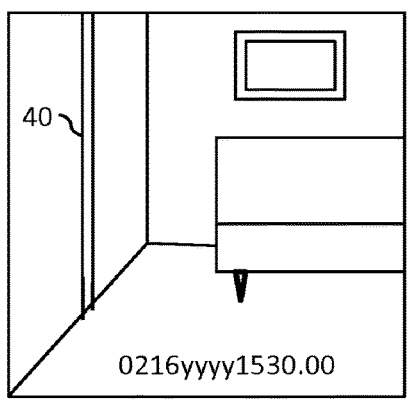
Figure 3F:
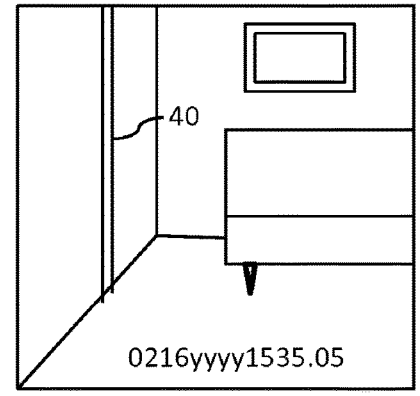
Figure 3G:
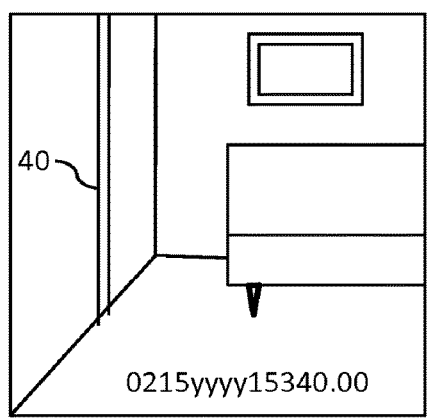
Figure 3H:
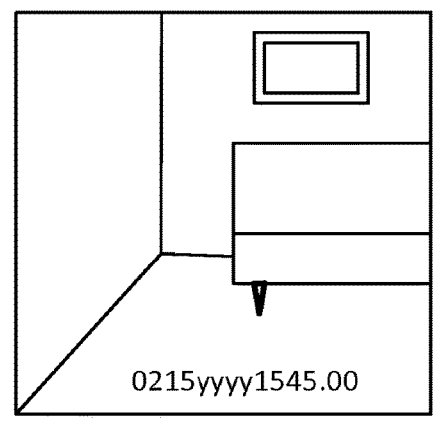

FIG. 2 illustrates a flow chart which provides a general description of a first embodiment of the archival video system of FIG. 1. In step 30, a current image is received through camera 12 and imaging circuitry 14. In step 32, processing circuitry 16 determines whether the current image matches one of the previously recorded profile images within a predetermined threshold, such that the profile image can be used for the current image, or such that a relatively small delta file can be generated to provide the difference information between the selected profile image and the current image. If the profile image can be used unchanged, i.e., if the selected profile image is a very close match to the current image, the delta image will be a null file.

If the current image can be described in terms of an existing profile image and a small delta file, then, in step 34, a historical table 18*c* is updated to include the index (such as current time and date), the name of the selected profile image from database 18*a* and the name of the selected delta file which is created by processing circuitry 16 and stored in database 18*b*.

If the current image cannot be efficiently stored by reference to a profile image and a small delta file, the current image is stored as a new, complete image in the image database 18*a*. The new image may or may not be used as a profile image for later received images.

The embodiment described above provides significant advantages over the prior art with regard to communication bandwidth and storage requirements. By using a high quality set of profile images produced under controlled conditions, or by selecting some or all of the full images generated during actual use of the video system as the profile images, only small delta files will be generated during normal archival recording of the images from camera 12, except when motion is present. By transferring the profile images to a remote location, only the delta files and references to the profile images will need to be communicated to the remote location to produce real time video, greatly reducing the bandwidth requirement for most situations. When motion is present, the bandwidth requirements will increase temporarily, which may present a video stream in non-real time for a short period.

With regard to storage, storing a large portion of the recorded video as delta files, rather than full images significantly reduces the amount of storage necessary. This may allow for non-volatile semiconductor memory, such as flash memory, to be used for storage 18. Use of semiconductor memory provides two benefits: (1) use in applications where vibrations or sudden movement may result in damage or inoperability of a mechanical storage medium, such as a hard disk and (2) integration of the memory with the processing (and communications/display circuitry, if provided) for a single integrated circuit solution for reduced cost.

FIGS. 3*a*-3*h* show examples of images taken of a corner of a waiting room at five minute intervals. For illustration purposes, a shadow 40 is shown sweeping across a wall. In the illustrated embodiment, each profile image is given a name based on its index, such as the time and day it was taken; i.e., "0215yyyy1545.00" was taken on February 15 at 3:45:00 PM in year "yyyy". Depending upon the particular application, profile images could be taken at any appropriate time period. For example, in a specific application, there may be only two profile images—one image taken during office hours and one image taken for off-hours. In other applications, particularly outdoor images, the time of day, day of year, weather and lighting conditions may present the need for a large number of profile images.

Figure 4A:
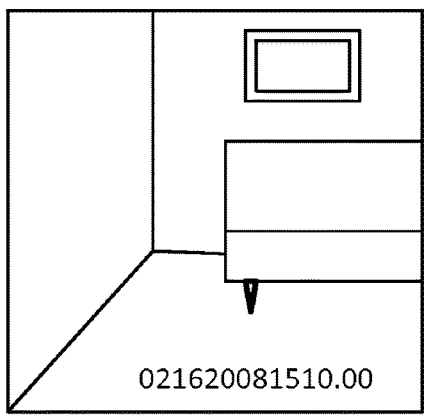
FIGS. 4a through 4h illustrate an example of current images compared to the profile images of FIGS. 3a through 3h.
Figure 4B:
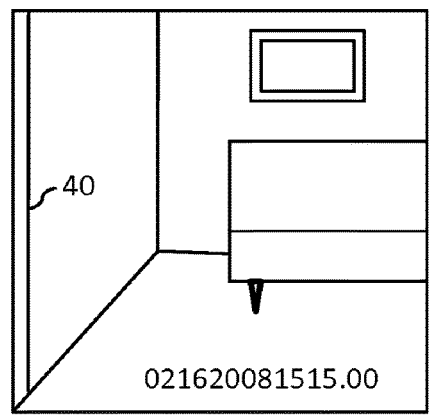
Figure 4C:
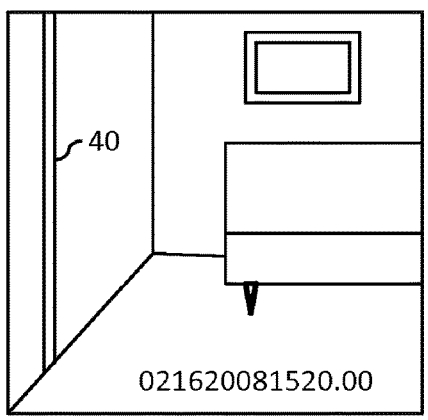
Figure 4D:
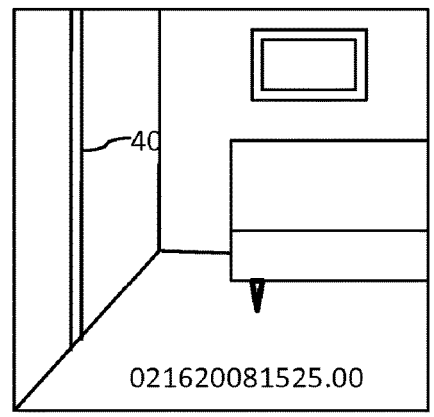
Figure 4E:
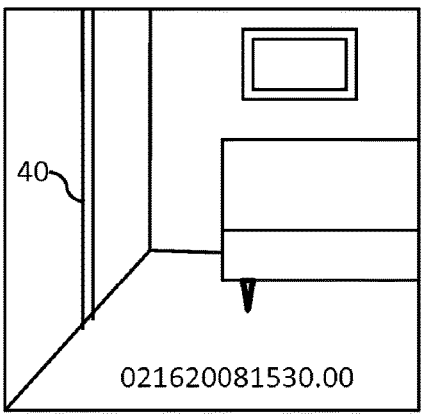
Figure 4F:
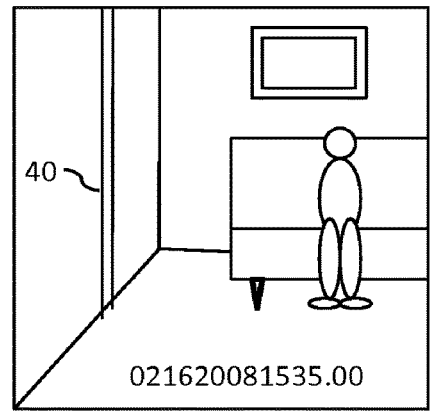
Figure 4G:
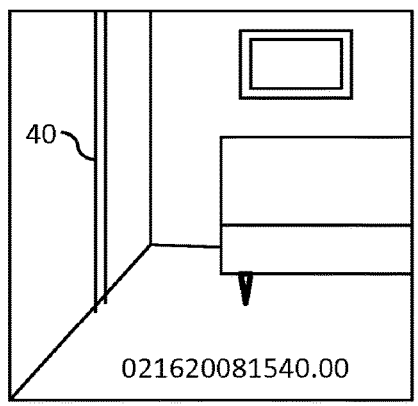
Figure 4H:
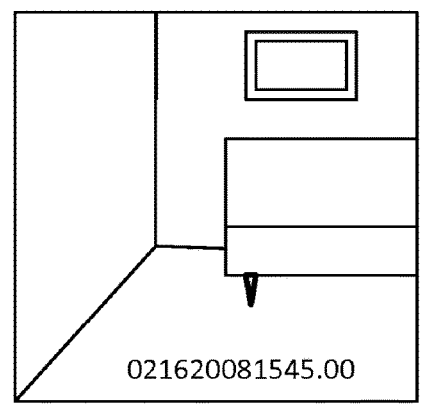
Figure 4I:
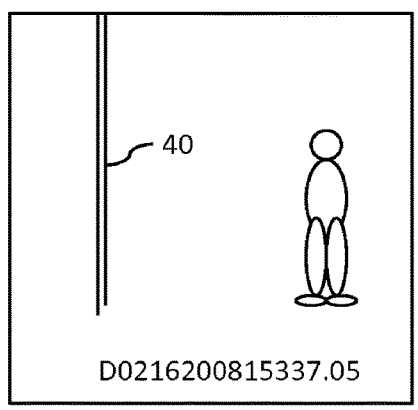
FIG. 4i illustrates an uncompressed delta image.

FIGS. 4*a*-4*h* illustrate a series of pictures received by the camera, also at five minute intervals. Again, the title gives the index (time and date) associated with the image. FIGS. 4*a*-4*e* show images that are very similar to respective profile images shown in FIGS. 3*a*-3*e*. The delta images for these images should be a null file or a very small file. At times intermediate to the images shown, a small delta image tracking the shadow will be generated. In FIG. 4*f*, however, a person sits on the couch, causing a larger delta file, shown in FIG. 4*i*, to be generated for the duration that the time the person is in the image. Table 1 summarizes the information that would be in a table 18*c* for this time period.

TABLE 1

Historical Image Table

| Index Date&Time | Profile Image | Delta Image | Comments |
| --- | --- | --- | --- |
| 021620081510.00 | 0216yyyy1510.00 | null | empty waiting room |
| 021620081510.05 | 0216yyyy1510.00 | null | |
| 021620081510.10 | 0216yyyy1510.00 | null | |
| ... | ... | ... | |
| 021620081510.30 | 0216yyyy1510.00 | D021620081510.30 | shadow appears |
| 021620081510.35 | 0216yyyy1510.00 | D021620081510.30 | |
| ... | | | |
| 021620081511.05 | 0216yyyy1510.00 | D021620081511.05 | shadow moves |
| ... | | | |
| 021620081515.00 | 0216yyyy1515.00 | null | |
| 021620081515.05 | 0216yyyy1515.00 | null | |
| ... | | | |
| 021620081533.24 | 0216yyyy1530.00 | D021620081533.24 | person enters |
| 021620081533.25 | 0216yyyy1530.00 | D021620081533.25 | |

TABLE 1-continued

Historical Image Table

| Index Date&Time | Profile Image | Delta Image | Comments |
|---|---|---|---|
| 021620081533.26 | 0216yyyy1530.00 | D021620081533.26 | |
| ... | | | |
| 021620081534.00 | 0216yyyy1530.00 | D021620081534.00 | person sits |
| 021620081534.05 | 0216yyyy1530.00 | D021620081534.05 | |
| ... | | | |
| 021520081540.00 | 0216yyyy1540.00 | null | person leaves view |
| 021520081545.00 | 021520081510.00 | null | shadow gone |

At 2:10, the waiting room being recorded is empty. The current images being received by the camera should be similar to a profile image. In this case, as shown in FIG. 1, profile image "0216yyyy1510.00" is used, which should closely resemble the current image with regard to the shadow and furniture. A null delta file provided with this case, and the historical table simply notes that at Feb. 16, 2008 at 3:10:00 PM the image received was the same as image "0216yyyy1510.00". This remains true until 3:10:30 when the shadow has moved enough to exceed a threshold between the currently received image and the closest profile image. At this point, a delta file is generated describing the differences—in this case, the delta file would show movement of the shadow.

The archival video system continues to record combinations of profile images (which in the illustrated example are changing on about five minute intervals) and delta files. AT 3:33:24 PM, a person enters the waiting room. At this point, a larger delta file is produced to alter the profile image to include the person. If multiple people had entered, the change might be so drastic as to require a new image to be produced without reference to a pre-existing profile image. In the example, it is assumed that the person entering the view of the camera did not exceed this threshold. At this point, in the illustrated example, the more noticeable movement indicates a need to take more images, so current images are sampled every second, rather than every five seconds.

At 3:34:00, the person sits. The reduction in movement while the person is sitting could result in images being taken at every five seconds. By 3:40:00, the person has left the view of the camera 12, and by 3:45:00, the shadow 10 is no longer present. Thus, the "021520081510.00" profile image can be used again. Also, in a real implementation, the current image may be sampled multiple times per second. For a smooth video, a sampling rate of 30 times per second, for example, may be used.

It should be noted that in a real application, there are likely to be changes in lighting condition and small variations in furniture placement that would result in a delta image be generated for every current image. Over time, small changes, such as an addition of an end table, may be incorporated into a new set of profile images to reduce the size of the delta files.

When communicating the image to a remote location, only the name of the image profile and the data in the delta file (which may be compressed using well know techniques or uncompressed) need be transmitted. The processing circuitry 16 determines whether the remote location has access to the profile image, for example by communication with the remote location or by maintaining a database of profile images accessible to the remote location. Sending only the reference to the image profile and the delta file, rather than the full current image, can greatly reduce the amount of information transmitted, which is particularly important with low bandwidth communication systems, such as an analog telephone line. Thus, live monitoring may be available using standard telephone lines, with high resolution. Even if a high bandwidth communication link is available, it may be insufficient due to a large number of camera feeds, so the invention provides significant benefits with regard to communication regardless of the bandwidth of the link.

A single image can be reconstructed from a profile image and delta file at a specified index. A series of images can be reconstructed and processed into a conventional video format.

Eventually, the storage will become full if images are not deleted. Images, including delta files and profile images, not used within a specified time period (such as the last 30 days) or having a lower frequency of usage (by reference to a usage histogram) can be removed as needed, along with the archival table entries in table 18c. Except where the capacity of the storage device would be exceeded, profile images should only be deleted if they are used in for any index that remains. In one embodiment, the smaller delta files and archival table entries may remain for a longer time period, because of the small amount of space used by these files, which may provide some useful record if needed, although not full images. Alternatively, rather than delete files, the unneeded files can be moved to another storage medium, such as magnetic tape or hard drives.

Figure 5A:
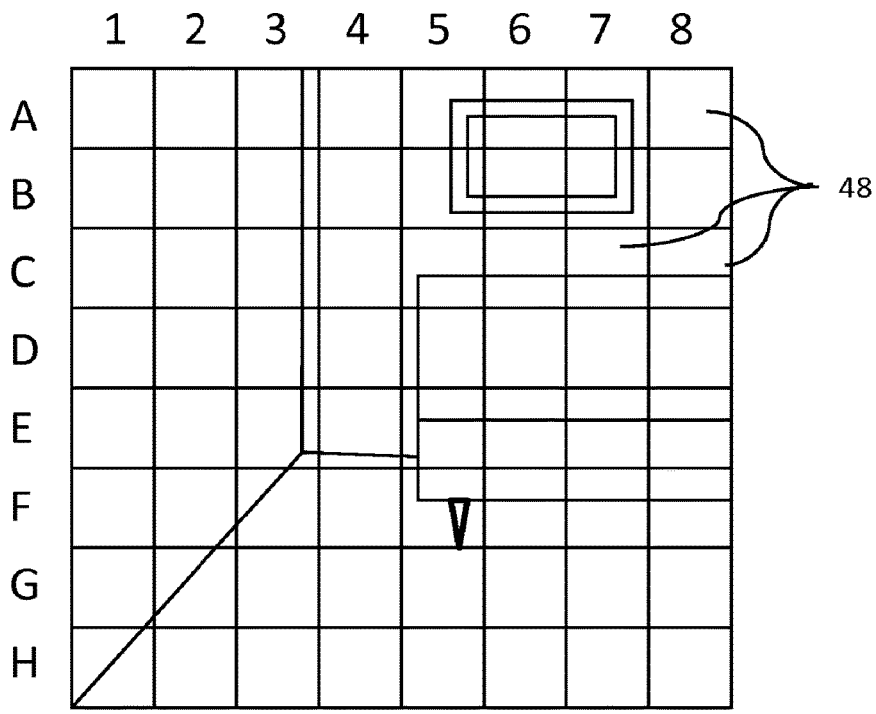
FIGS. 5a and 5b illustrates a segmented image.
Figure 5B:
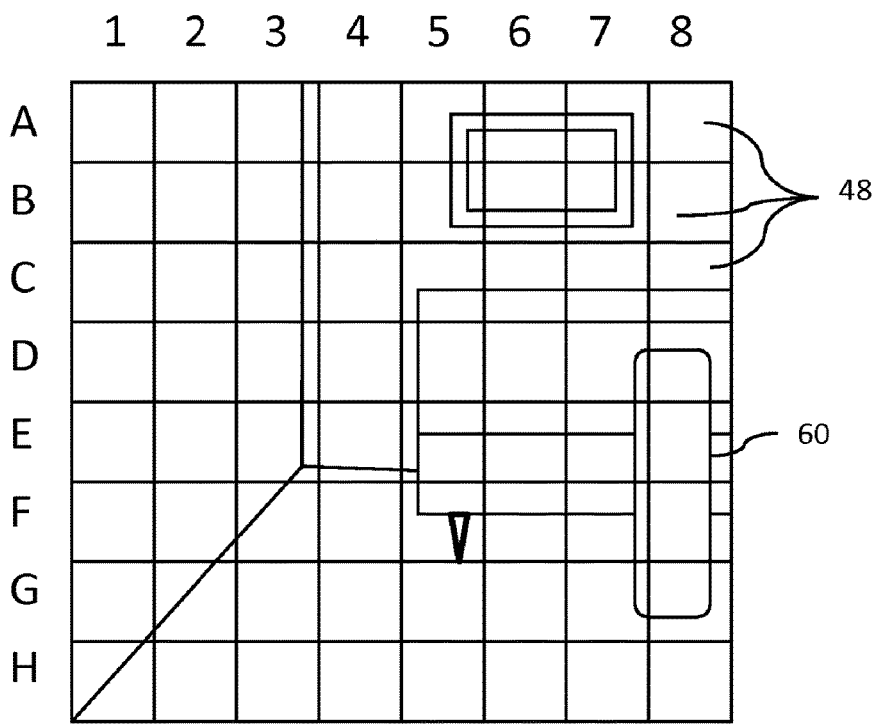

FIGS. 5a and 5b illustrate a second embodiment of the invention where an image frame is divided into multiple sectors 48. In the illustrations, the image is segmented into an 8×8 grid to provide sixty-four sectors 48. Each sector 48 can be individually treated by the method shown in the flow chart of FIG. 2. In other words, each current image is formed of a predetermined number and arrangement of sectors 48, and each sector 48 can be represented as either (1) a new sector image or (2) a referenced pre-existing profile sector image and a delta file (which could be a null file). In a simplified version, delta files are not used, each sector is represented either by reference to a profile sector or as a new sector image. In addition, some sectors may be masked to eliminate image changes due to movement in irrelevant parts of the image. For example, in an image of a parking lot next to a highway, sectors showing the highway may be masked to prevent image changes due to traffic on the highway.

Similarly, each sector could be updated at a rate appropriate to that sector. For example, in an ATM, the area where a person's face is likely to appear may be updated multiple times per second whereas peripheral regions might be scanned every two seconds. The update rate could be variable, based on detected motion in a sector or in nearby sectors.

Figure 6:
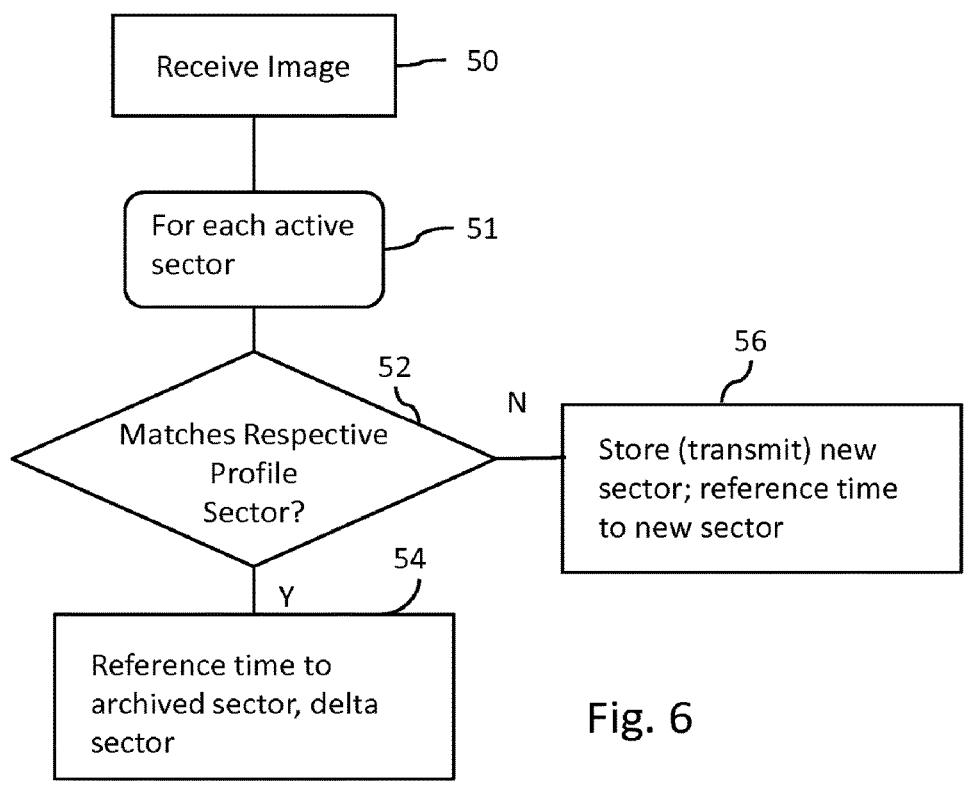
FIG. 6 illustrates a flow diagram describing the operation of the processing circuitry of the archival video system with regard to updating a segmented image.

FIG. 6 illustrates the storage and transmission of the segmented image, which is similar to that described above with the unified image. In step 50, a current image is received through camera 12 and imaging circuitry 14. Active sectors are identified in step 51, since some sectors may be masked (ignored) and other sectors may be updated more frequently than others. In step 52, processing circuitry 16 determines whether the current sector image for each active sector matches a previously recorded profile sector within a predetermined threshold, such that the sector image can be used for the current sector, or such that a relatively small sector delta file can be generated to provide the difference information between the selected profile sector and the current sector. If the profile sector can be used unchanged, the sector delta file will be a null file. If no profile sector is within the threshold, a new sector image is generated and stored; this file may be added to the database as a possible profile sector for later updates.

Referring again to FIGS. 5a and 5b, FIG. 5a illustrates the segmented image used in the example above, while FIG. 5b illustrates an object 60 entering the image. It is assumed for this example that the object 60 is the only difference between the two images.

Table 2 illustrates a possible image definition of the image of FIG. 5a at 3:10:00 PM.

TABLE 2

Segmented Image Before Movement

| Index Time&Date | Sector | Profile Sector | Delta Sector |
|---|---|---|---|
| 021620081510.00 | A1 | 0216yyyy1510A1 | null |
|  | A2 | 0216yyyy1510A2 | null |
|  | A3 | 0216yyyy1510A3 | null |
| ... | ... | ... | ... |
|  | H7 | 0216yyyy1510H7 | null |
|  | H8 | 0216yyyy1510H8 | null |

In Table 2, each sector matches a previously stored sector with no delta file necessary. While Table 2 indicates that all of the selected profile samples were taken from a previous image sampled at 3:10 on February 14, it would be possible for each sector to have a selected profile sector that was generated at a different date.

At 3:10:05, the object 60 enters the view of camera 12 in sectors E7, 10 E8, F7, F8, G7, G8, H7 and H8. At this point, the table defining the image at 3:10:05 is modified to that shown in Table 3.

TABLE 3

Segmented Image After Movement

| Index Time&Date | Sector | Profile Sector | Delta sector |
|---|---|---|---|
| 021620081510.05 | A1 | 0216yyyy1510A1 | null |
|  | A2 | 0216yyyy1510A2 | null |
|  | A3 | 0216yyyy1510A3 | null |
| ... | ... | ... | ... |
|  | E7 | 0216yyyy1510E7 | D021620081510E7 |
|  | E8 | 021620081510E8 | null |
| ... | ... | ... | ... |
|  | F7 | 0216yyyy1510F7 | D021620081510F7 |
|  | F8 | 021620081510F8 | null |
| ... | ... | ... | ... |
|  | H7 | 0216yyyy1510H7 | D021620081510H7 |
|  | H8 | 021620081510H8 | null |

In Table 3, it is assumed that the changes in sectors E7, F7, G7 and H7 can be described in terms of the previous profile sector and a delta file, while the changes in sectors E8, F8, G8, and H8 necessitate a new image for the sector. In an alternative embodiment, any sector that is changed is provided with a new image.

To reconstruct the image, the profile sectors and delta sectors (if used) are combined. For transmission of the image, the names of the profile sectors are sent (after determining whether the profile sectors are accessible to the remote location, as described above) and the only image data sent is the image data for the delta sectors (if used) and the image data for the sectors which do not match a pre-existing profile sector.

As movement is detected in one or more sectors, movement across the image may be predicted; hence, the sectors surrounding, but not including, the object 60 may be treated as if they have changed as well, without analysis. This may reduce some computing requirements in situations where rapid movement is involved, particularly at high frame rates.

Attributes of the image may be varied on a sector by sector basis. Sectors in areas of interest may be sampled at higher rates, or with higher resolution and compressed at a lower compression rate (or left uncompressed) relative to sectors in less interesting areas.

While the sectors are shown as an array of rectangles, the sectors could be arranged in a single column, or could be irregular shapes designed to match the particular scene being recorded.

It may be beneficial to start comparison of the sectors from top to bottom and from left to right as the image is received from the imaging circuitry 12 (or in whatever order the image is received by the processor).

A single image can be reconstructed for a specified index by combining the images associated with each sector into a single file. Multiple images could be reconstructed and combined into a video stream using conventional formats.

To recover space in the data storage 18, profile sector images, delta files, new images and archival data can be removed or moved to another storage device. Again, it is necessary to preserve profile sector images that are used in images being retained.

The search for of a suitable profile image or profile sector, or an optimum profile image or profile sector, could be performed in a number of ways, and the most efficient manner of determination may depend upon the particular scene being recorded. Each potential profile image/sector may include information about the image/sector that is indicative of whether a comparison with the current image/sector is warranted. This information could include, for example, lighting levels, luminosity, date and/or time of day and histograms of intensity levels in one or more colors. The information could be provided as part of the file name of the image/sector, or as part of the database. The search could begin at a predetermined profile image (for example, a profile image specified by the time of day) and then proceed to other profile images based on a specific criterion, such as closeness in luminosity. Suitable image/sectors could be then compared on a pixel-by-pixel basis.

While the present invention has been described in connection with certain criteria, such as certain frame rates, it is expected that the invention can be used effectively at any frame rate that the processing circuitry 14 can support. Naturally, processing circuitry 14 could include multiple processors operating in parallel to increase the resources.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A video recording apparatus comprising:
    image receiving circuitry configured to receive electronic images;
    data storage configured to store a plurality of profile images; and
    processing circuitry, coupled to the image receiving circuitry and the data storage, configured to:
        receive a current image from the image receiving circuitry at a specified index;

allocate the current image to a plurality of predefined sectors each containing a predefined sector image that is a portion of the current image;

detect movement in one or more sectors; and for each of a plurality of the predefined sector images where movement is not detected:

compare the predefined sector image with a plurality of previously generated profile sector images stored in a storage device;

determine whether the predefined sector image matches a profile sector image within a predetermined threshold; and associate the index and the predefined sector with a profile sector image that matches the predefined sector image of the predefined sector within a predetermined threshold.

2. The video recording apparatus of claim 1 and further including a camera coupled to the image receiving circuitry.

3. The video recording apparatus of claim 1 wherein the data storage comprises a non-volatile solid state memory.

4. The apparatus of claim 1, wherein the processing circuitry is further configured to select a profile image that closely matches the current image and associate a reference to the selected profile image with the index of the current image.

5. The video recording apparatus of claim 4, wherein the processing circuitry further performs the steps of:

comparing the current image with the selected profile image to determine differences;

generating a delta file providing information on the differences between the current image and the selected profile image; and associating the delta file with the reference to the selected profile image and the index of the current image.

6. The video recording apparatus of claim 5 wherein the processing circuitry compresses the delta file.

7. The video recording apparatus of claim 5 wherein the processing circuitry further stores an association between the index, the selected profile image and the delta file.

8. The video recording apparatus of claim 5 wherein the processing circuitry generates a single image from the selected profile image and the delta file.

9. The video recording apparatus of claim 4 and further comprising communication circuitry configured to communicate data to a remote processing device and wherein the processing circuitry sends a representation of the current image to the remote processing device by sending the reference to the selected profile image.

10. The video recording apparatus of claim 9 wherein the processing circuitry transmits a copy of the selected profile image if the remote processing device does not have a copy of the selected profile image.

11. The video recording apparatus of claim 10 wherein the processing circuitry communicates with the remote processing device to determine whether the remote processing device have access to the copy of the selected profile image.

12. The video recording apparatus of claim 4 wherein the processing circuitry selects the profile image at least in part by reference to current lighting conditions and lighting conditions associated with each of the profile images.

13. The video recording apparatus of claim 4 wherein the processing circuitry selects the profile image at least in part by reference to luminosity in the current image and luminosity associated with each of the profile images.

14. The video recording apparatus of claim 4 wherein the processing circuitry selects the profile image at least in part by reference to a time of day associated with the current image and a time of day associated with each of the profile images.

15. The video recording apparatus of claim 4 wherein the processing circuitry selects the profile image at least in part by reference to a date associated with the current image and a date associated with each of the profile images.

16. A video recording apparatus comprising:

image receiving circuitry configured to receive electronic images;

data storage configured to store a plurality of profile images; and processing circuitry, coupled to the image receiving circuitry and the data storage, configured to:

receive a current image at a specified index;

allocate the current image to a plurality of predefined sectors each containing a predefined sector image that is a portion of the current image;

sample predefined sector images of at least one predefined sector at a first rate and/or resolution;

sample predefined sector images of at least one other predefined sector of interest at a higher rate and/or resolution than said first resolution; and for each of a plurality of the predefined sector images:

compare the predefined sector image with a plurality of previously generated profile sector images stored in a storage device;

determine whether the predefined sector image matches a profile sector image within a predetermined threshold; and associate the index and the predefined sector with a profile sector image that matches the predefined sector image of the predefined sector within a predetermined threshold.

17. The apparatus of claim 16, wherein the processing circuitry is further configured to select a profile image that closely matches the current image and associate a reference to the selected profile image with the index of the current image.

18. The apparatus of claim 17 and further comprising the steps of using the processing circuitry to:

compare the current image with the selected profile image;

generate a delta file providing information on differences between the current image and the selected profile image; and associate the delta file with the reference to the selected profile image and the index of the current image.

19. The apparatus of claim 18 and further comprising the step of communicating delta files and the reference to the selected profile image to a remote processing device.

20. The apparatus of claim 18 wherein the processing circuitry further stores an association between the index, the selected profile image and the delta file.

21. The apparatus of claim 20 and further comprising the step of transmitting a copy of the selected profile image if the remote processing device does not have a copy of the selected profile image.

22. A method of recording video comprising:

receiving electronic images;

using processing circuitry for:

receiving a current image at a specified index;

allocating the current image to a plurality of predefined sectors each containing a predefined sector image that is a portion of the current image;

detect movement in one or more sectors;

for each of a plurality of the predefined sector images where movement is not detected:
comparing the predefined sector image with a plurality of previously generated profile sector images stored in a storage device;
determining whether the predefined sector image matches a profile sector image within a predetermined threshold; and
associating the index and the predefined sector with a profile sector image that matches the predefined sector image of the predefined sector within a predetermined threshold.

23. A method of recording video comprising:
receiving electronic images;
using processing circuitry for:
receiving a current image at a specified index;
allocating the current image to a plurality of predefined sectors each containing a predefined sector image that is a portion of the current image;
for each of a plurality of the predefined sector images, at a predefined update rate for each predefined sector:
comparing the predefined sector image with a plurality of previously generated profile sector images stored in a storage device;
determining whether the predefined sector image matches a profile sector image within a predetermined threshold; and
associating the index and the predefined sector with a profile sector image that matches the predefined sector image of the predefined sector within a predetermined threshold.

24. The method of claim 23, wherein the predefined update rate for a predefined sector of interest of the current image is higher than an update rate of a predefined sector of a peripheral region of the current image.

25. The method of claim 24, wherein the predefined sector of interest is likely to show a person's face.

26. The method of claim 23, wherein the predefined update rate of one predefined sector is based on motion detected in that predefined sector.

27. The method of claim 23, wherein the predefined update rate of one predefined sector is based on motion detected in a nearby predefined sector.

28. A method of recording video comprising:
receiving electronic images;
using processing circuitry for:
receiving a current image at a specified index;
allocating the current image to a plurality of predefined sectors each containing a predefined sector image that is a portion of the current image;
detect movement in one or more sectors;
for a plurality of the predefined sector images where movement is not detected:
comparing the plurality of the predefined sector images with a plurality of previously generated profile sector images stored in a storage device;
determining whether the plurality of the predefined sector images match profiles of corresponding sector images within a predetermined threshold; and
associating the index and the plurality of predefined sectors with profile sector images that match the predefined sector images of the plurality of predefined sectors within a predetermined threshold.

29. The method of claim 28 wherein the irrelevant movement is vehicular traffic.

30. A method of recording video comprising:
receiving electronic images;
using processing circuitry to:
receiving a current image at a specified index;
allocating the current image to a plurality of predefined sectors each containing a predefined sector image that is a portion of the current image;
masking predefined sectors in irrelevant parts of the image;
for each of a plurality of predefined sector images contained in an unmasked predefined sector:
comparing the predefined sector image with a plurality of previously generated profile sector images stored in a storage device;
determining whether the predefined sector image matches a profile sector image within a predetermined threshold; and
associating the index and the unmasked predefined sector with a profile sector image that matches the unmasked predefined sector image of the predefined sector within a predetermined threshold.

31. The method of claim 30 wherein the irrelevant parts of the image contain irrelevant movement.

32. A method of recording video comprising:
receiving electronic images;
using processing circuitry for:
receiving a current image at a specified index;
allocating the current image to a plurality of predefined sectors each containing a predefined sector image that is a portion of the current image;
sampling predefined sector images of at least one predefined sector at a first rate and/or resolution;
sampling predefined sector images of at least one other predefined sector of interest at a higher rate and/or resolution than said first resolution;
for each of a plurality of the predefined sector images:
comparing the predefined sector image with a plurality of previously generated profile sector images stored in a storage device;
determining whether the predefined sector image matches a profile sector image within a predetermined threshold; and
associating the index and the predefined sector with a profile sector image that matches the predefined sector image of the predefined sector within a predetermined threshold.

33. The method of claim 32, wherein the at least one other predefined sector of interest is likely to show a person's face.

34. The method of claim 32, wherein the at least one predefined sector sampled at the first rate and/or resolution is a peripheral region of the current image.

* * * * *